United States Patent
Enami

(10) Patent No.: US 9,989,124 B2
(45) Date of Patent: Jun. 5, 2018

(54) AUTOMATIC TRANSMISSION

(71) Applicant: SUZUKI MOTOR CORPORATION, Shizuoka (JP)

(72) Inventor: Noriyuki Enami, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 256 days.

(21) Appl. No.: 15/088,659

(22) Filed: Apr. 1, 2016

(65) Prior Publication Data

US 2016/0298732 A1 Oct. 13, 2016

(30) Foreign Application Priority Data

Apr. 8, 2015 (JP) .................. 2015-079239

(51) Int. Cl.
*F16H 3/091* (2006.01)
*F16H 3/00* (2006.01)
*F16H 3/093* (2006.01)
*F16H 3/08* (2006.01)

(52) U.S. Cl.
CPC ............ *F16H 3/091* (2013.01); *F16H 3/006* (2013.01); *F16H 3/093* (2013.01); *F16H 2003/0822* (2013.01); *F16H 2200/0052* (2013.01)

(58) Field of Classification Search
CPC .............. F16H 3/14; F16H 2003/0822; F16H 2200/0056; F16H 3/006; F16H 3/091; F16H 3/3093
USPC .................................. 74/329, 331
See application file for complete search history.

(56) References Cited

U.S. PATENT DOCUMENTS

| 9,528,571 | B2 * | 12/2016 | Kumagai | F16H 3/08 |
| 2007/0240531 | A1 * | 10/2007 | Endo | F16H 3/08 74/331 |
| 2007/0277634 | A1 * | 12/2007 | Komori | F16H 3/38 74/340 |
| 2013/0047760 | A1 * | 3/2013 | Ohmori | F16H 3/08 74/335 |
| 2013/0072337 | A1 * | 3/2013 | Lee | F16H 37/08 475/5 |

FOREIGN PATENT DOCUMENTS

| JP | 2008-291892 A | 12/2008 | |
| JP | 2010164192 A | * 7/2010 | ............. F16H 3/093 |
| JP | 2013177958 A | * 9/2013 | ............. F16H 57/031 |

* cited by examiner

*Primary Examiner* — William C Joyce
*Assistant Examiner* — Joseph H Brown
(74) *Attorney, Agent, or Firm* — Rothwell, Figg, Ernst & Manbeck, P.C.

(57) ABSTRACT

A power transmission 1 includes an output shaft 9 disposed in parallel to an input shaft 5, and provided at one end with an output gear 35 and at an opposite end with a final drive gear 36 meshing with a final driven gear 37 of a differential device 10, the output gear 35 normally meshing with a reverse speed drive gear 26, and with a first speed driven gear 31 in an array 39 of driven gears 31, 32, 33, and 34 on a counter shaft 8 normally meshing with a first speed drive gear 14 in an array 20A of odd-speed shift position drive gears 14, 15, 16, and 17 on an odd-speed shift position drive shaft 6.

5 Claims, 10 Drawing Sheets

FRONT ↑ → RIGHT

FRONT ← → RIGHT

AUTOMATIC TRANSMISSION

CROSS-REFERENCE TO RELATED APPLICATION

This application is based upon and claims the benefit of priority from Japanese Patent Application No. 2015-079239, filed on Apr. 8, 2015, the entire contents of which are incorporated herein by reference.

BACKGROUND OF INVENTION

Technical Field

This invention relates to automatic transmissions, and specifically, to automatic transmissions of a twin clutch type including clutches provided in a systematic fashion for two systems being a speed-changing system involving shift positions for odd-numbered speeds (referred herein to sometimes simply as odd-speed shift positions) and another speed-changing system involving shift positions for even-numbered speeds (referred herein to sometimes simply as even-speed shift positions).

Background Art

As an automatic transmission to be mounted on vehicles such as automobiles in the past, there has been an automatic transmission of a twin clutch type disclosed in Japanese Patent Application Publication No. 2008-291892, including clutches provided in a systematic fashion for two systems being a speed change system for odd-speed shift positions and a speed change system for even-speed shift positions.

This twin clutch type automatic transmission included an input shaft for drive power to be transferred thereto from an engine through a torque converter, a first drive shaft disposed around the input shaft, to be coaxial with the input shaft, and adapted for use of a first clutch for a selective coupling with the input shaft, and a combination of an array of even-speed shift position drive gears and a reverse drive gear provided on the first drive shaft.

Further, this automatic transmission included a second drive shaft disposed in parallel to the input shaft and adapted for use of a second clutch for a selective coupling with the input shaft through a measure for power transfer, an array of odd-speed shift position drive gears provided on the second drive shaft, and an output shaft disposed in parallel to the input shaft and provided with a combination of a final drive gear meshing with a final driven gear of a differential device and a reverse idler gear meshing with the reverse drive gear.

Further, the first clutch as well as the second clutch was disposed at a location not overlapping the output shaft in radial directions. By doing so, the automatic transmission could have radially reduced outside dimensions, affording for the automatic transmission to be down-sized with enhanced power transmission efficiency.

SUMMARY OF INVENTION

Such the automatic transmission in the past, though having been schemed for a down-sized automatic transmission, included the reverse idler gear provided on the output shaft, as it was dedicated for meshing with the reverse drive gear on the first drive shaft. Along with this, there was needed the dedicated reverse idler gear, causing the more sacrificed down-sizing of the automatic transmission, giving rise to the more sacrificed light-weighting.

This invention has been devised in view of problems described.

It therefore is an object of this invention to provide an automatic transmission adapted for speed changes to be smooth, allowing for the automatic transmission to be downsized and light-weighted.

According to aspects of this invention, there is provided an automatic transmission including an input shaft coupled with a drive source, an odd-speed shift position drive shaft having an array of odd-speed shift position drive gears odd-numbered in an order of speed change ratios, an odd-speed shift position clutch installed on the odd-speed shift position drive shaft, and configured to make or break a transfer of drive power from the input shaft to the odd-speed shift position drive shaft, an even-speed shift position drive shaft disposed in parallel to the odd-speed shift position drive shaft, the even-speed shift position drive shaft having a combination of an array of even-speed shift position drive gears even-numbered in the order of speed change ratios and a reverse speed shift position drive gear, an even-speed shift position clutch installed on the even-speed shift position drive shaft, and configured to make or break a transfer of drive power from the input shaft to the even-speed shift position drive shaft, a counter shaft disposed in parallel to the odd-speed shift position drive shaft and the even-speed shift position drive shaft, the counter shaft having an array of driven gears adapted to engage with drive gears of both of the array of odd-speed shift position drive gears and the array of even-speed shift position drive gears, for use of the array of driven gears to rotate the counter shaft, and an output shaft disposed in parallel to the odd-speed shift position drive shaft and the even-speed shift position drive shaft, and provided at an end thereof with an output gear, and at another end thereof with a final drive gear meshing with a final driven gear of a differential device, the output gear meshing with the reverse speed shift position drive gear and with a first speed driven gear in the array of driven gears meshing with a first speed drive gear in the array of odd-speed shift position drive gears.

According to the aspects, the output shaft has at an end thereof the output gear, and at another end thereof the final drive gear meshing with the final driven gear of the differential device, the output gear meshing with the reverse speed shift position drive gear and with the first speed driven gear in the array of driven gears meshing with the first speed drive gear in the array of odd-speed shift position drive gears. By doing so, the output gear can be communized between a sequence of power transfer routs for a reverse speed and a set of sequences of power transfer routes for forward speeds, thus affording to avoid using reverse idler gear mechanisms in the past. Accordingly, the automatic transmission can be down-sized and light-weighted.

Further, the provision of a single output gear meshing with "the above-noted driven gear and the reverse speed shift position drive gear" does permit a switching between a reverse speed shift position and any forward speed shift position, thus affording to have a simplified sequence of power transfer routes when making a speed change between the reverse speed and any forward speed, thus allowing for a smoothed speed change.

DESCRIPTION OF EMBODIMENTS

Figure 1:
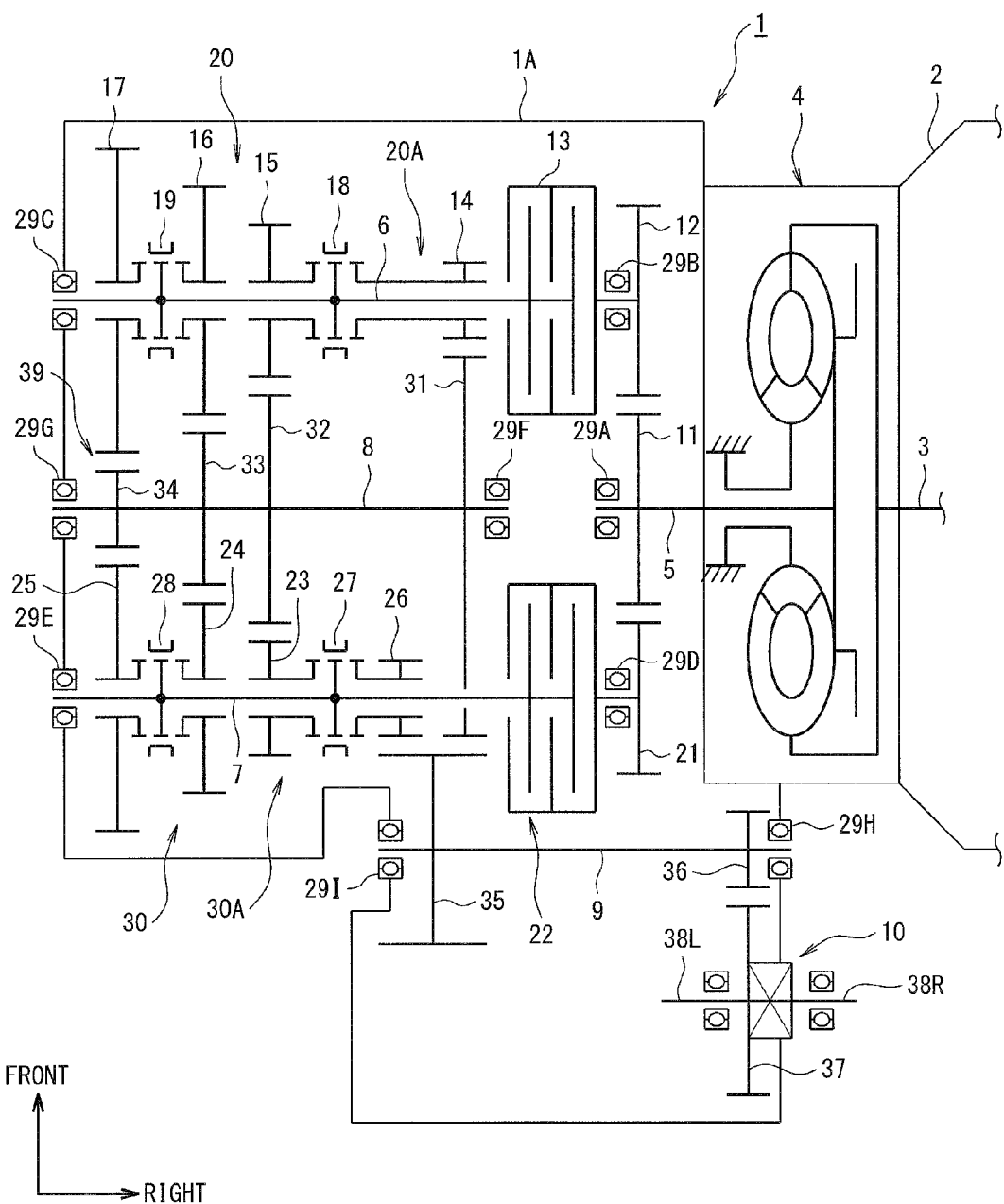
FIG. 1 is a skeleton diagram of an automatic transmission, as a figure showing an automatic transmission according to an embodiment of this invention.

There will be described automatic transmissions according to embodiments of this invention, with reference to the drawings. In the drawings, FIGS. 1 to 10 show an automatic transmission according to an embodiment of this invention. It is noted that FIGS. 1 to 10 each has a combination of arrowed frontward, rearward, rightward, leftward, upward and/or downward senses indicating corresponding senses of vehicle-longitudinal, vehicle-transverse, and vehicle-vertical directions identified in a field of vision at a driver's seat in an associated vehicle.

Description is now made of configuration. FIG. 1 shows an automatic transmission 1 to be furnished in vehicles such as automobiles. It has a set of shift positions for seven forward speeds and a single reverse speed.

Figure 3:
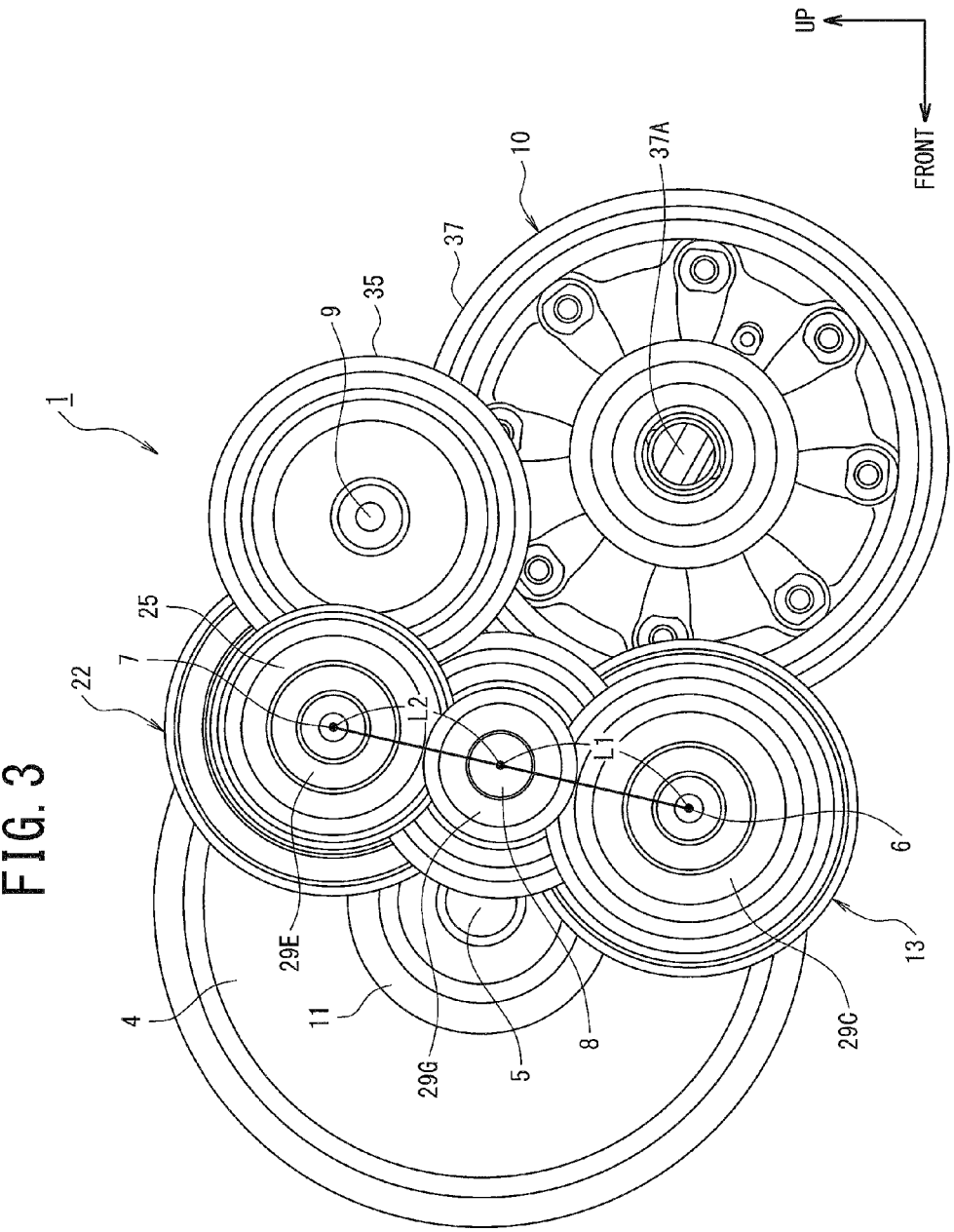
FIG. 3 is a side view of the automatic transmission, as a figure showing an automatic transmission according to an embodiment of this invention.

As shown in FIG. 1 or FIG. 3, the automatic transmission 1 includes an input shaft 5 coupled with a crankshaft 3 of an engine 2 through a torque converter 4, an odd-speed shift position drive shaft 6 disposed in parallel to the input shaft 5, an even-speed shift position drive shaft 7 disposed in parallel to the odd-speed shift position drive shaft 6, a counter shaft 8 disposed in parallel to the odd-speed shift position drive shaft 6 and the even-speed shift position drive shaft 7, and an output shaft 9 disposed in parallel to the odd-speed shift position drive shaft 6 and the even-speed shift position drive shaft 7, and adapted to transfer drive power to a differential device 10. Here, according to embodiments herein, the engine 2 constitutes a drive source according to this invention.

The input shaft 5 is supported by a bearing 29A in a rotatable manner to a transmission case 1A of the automatic transmission 1. The input shaft 5 has a drive gear 11 fixed thereto, the drive gear 11 meshing with an odd-speed shift position driven gear 12 and with an even-speed shift position driven gear 21.

Figure 2:
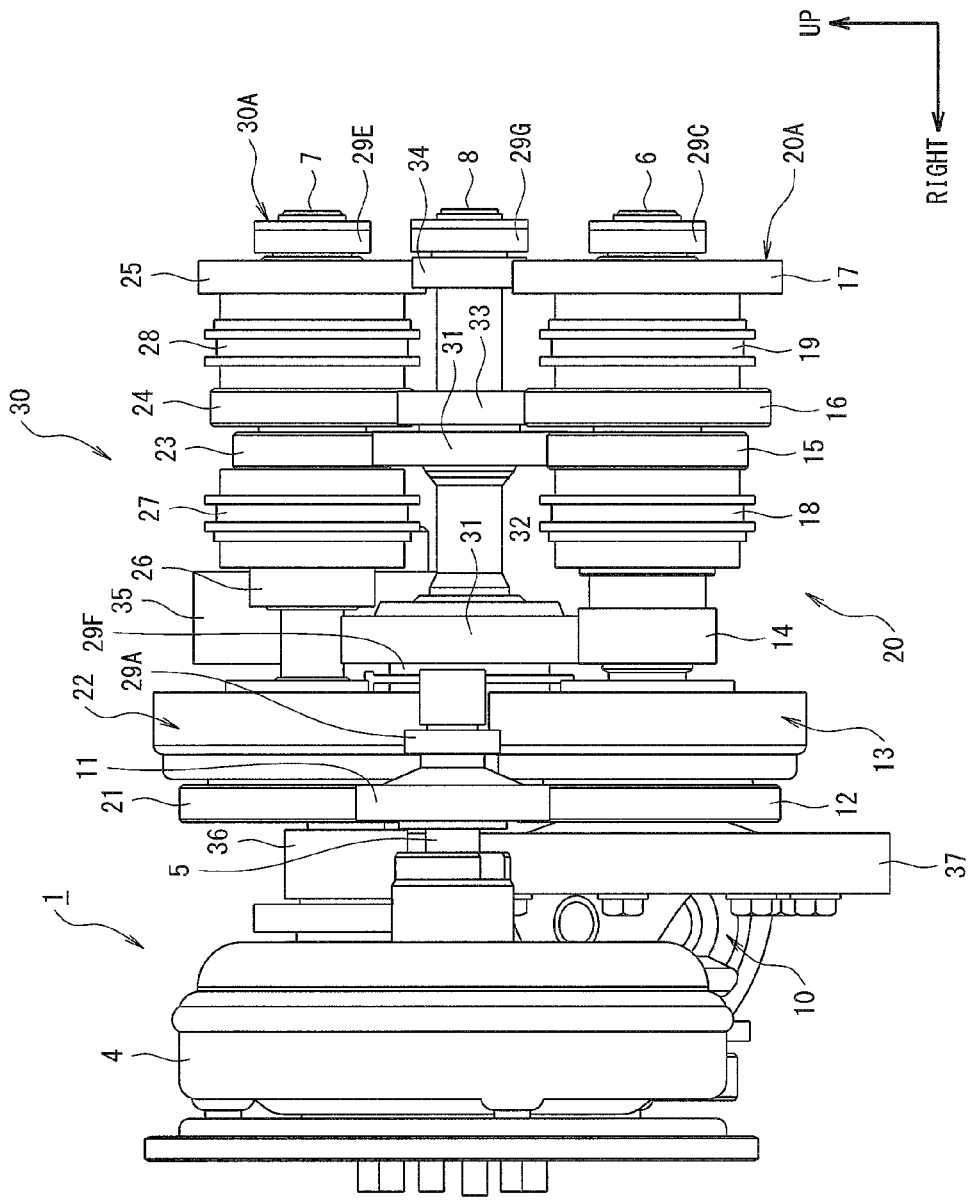
FIG. 2 is a front view of the automatic transmission, as a figure showing an automatic transmission according to an embodiment of this invention.

As shown in FIG. 1 or FIG. 2, the odd-speed shift position driven gear 12 is fixed to an odd-speed shift position clutch 13. The odd-speed shift position clutch 13 is installed on the odd-speed shift position drive shaft 6. The odd-speed shift position clutch 13 is adapted to have the odd-speed shift position driven gear 12 interlocked with or released to be free from the odd-speed shift position drive shaft 6, depending on whether not the odd-speed shift position clutch 13 is supplied with hydraulic pressures.

By doing so, when the odd-speed shift position clutch 13 is supplied with hydraulic pressures, the odd-speed shift position driven gear 12 is interlocked with the odd-speed shift position drive shaft 6, thus permitting drive power of the input shaft 5 to be transferred to the odd-speed shift position drive shaft 6, via the drive gear 11 on the input shaft 5, the odd-speed shift position driven gear 12, and the odd-speed shift position clutch 13.

On the other hand, when the odd-speed shift position clutch 13 has hydraulic pressures released therefrom, the odd-speed shift position driven gear 12 is disconnected from the odd-speed shift position drive shaft 6, thus keeping drive power of the input shaft 5 from being transferred to the odd-speed shift position drive shaft 6. That is, the transfer of drive power from the input shaft 5 is broken.

The odd-speed shift position drive shaft 6 has an array 20A of odd-speed shift position drive gears odd-numbered in an order of speed change ratios, including a $1^{st}$ speed drive gear 14, a $3^{rd}$ speed drive gear 15, a $5^{th}$ speed drive gear 16, and a $7^{th}$ speed drive gear 17. The $1^{st}$ speed drive gear 14, the $3^{rd}$ speed drive gear 15, the $5^{th}$ speed drive gear 16, and the $7^{th}$ speed drive gear 17 are each rotatable relative to the odd-speed shift position drive shaft 6. The odd-speed shift position drive shaft 6 as well as the odd-speed shift position clutch 13 is supported by bearings 29B and 29C in a rotatable manner to the transmission case 1A.

The odd-speed shift position drive shaft 6 is provided with "a shift sleeve serving for making a shift between a $1^{st}$ speed shift position and a $3^{rd}$ speed shift position" (referred herein to as "a $1^{st}$ speed—$3^{rd}$ speed oriented shift sleeve") 18, and "a shift sleeve serving for making a shift between a $5^{th}$ speed shift position and a $7^{th}$ speed shift position" (referred herein to as "a $5^{th}$ speed—$7^{th}$ speed oriented shift sleeve") 19. The $1^{st}$ speed—$3^{rd}$ speed oriented shift sleeve 18 as well as the $5^{th}$ speed—$7^{th}$ speed oriented shift sleeve 19 is fit on the odd-speed shift position drive shaft 6, to be movable in axial directions of the odd-speed shift position drive shaft 6, and rotatable in rotational directions integrally with the odd-speed shift position drive shaft 6.

The $1^{st}$ speed—$3^{rd}$ speed oriented shift sleeve 18 as well as the $5^{th}$ speed - $7^{th}$ speed oriented shift sleeve 19 is adapted, in situations involving a non-depicted shift lever shifted to a drive range by operation of a driver, to be driven with hydraulic pressures supplied from a non-depicted oil pump being commanded from a non-depicted controller, in accordance with a speed change map set up in the controller.

The $1^{st}$ speed—$3^{rd}$ speed oriented shift sleeve 18 is adapted, in a situation involving a current shift position determined to be a shift position for a $1^{st}$ speed in accordance with the speed change map, to be moved from a neutral position thereof in FIG. 1, rightward, with hydraulic pressures supplied from the oil pump following that determination. Along with this, the odd-speed shift position drive shaft 6 is interlocked with the $1^{st}$ speed drive gear 14.

The $1^{st}$ speed—$3^{rd}$ speed oriented shift sleeve 18 is adapted, in a situation involving a current shift position determined to be a shift positon for a $3^{rd}$ speed in accordance with the speed change map, to be moved from the neutral position in FIG. 1, leftward, with hydraulic pressures supplied from the oil pump following that determination. Along with this, the odd-speed shift position drive shaft 6 is interlocked with the $3^{rd}$ speed drive gear 15.

The $5^{th}$—$7^{th}$ speed oriented shift sleeve 19 is adapted, in a situation involving a current shift position determined to be a shift positon for a $5^{th}$ speed in accordance with the speed change map, to be moved from a neutral position thereof in FIG. 1, rightward, with hydraulic pressures supplied from the oil pump following that determination. Along with this, the odd-speed shift position drive shaft 6 is interlocked with the $5^{th}$ speed drive gear 16.

The $5^{th}$ speed—$7^{th}$ speed oriented shift sleeve 19 is adapted, in a situation involving a current shift position determined to be a shift positon for a $7^{th}$ speed in accordance with the speed change map, to be moved from the neutral position in FIG. 1, leftward, with hydraulic pressures supplied from the oil pump following that determination. Along with this, the odd-speed shift position drive shaft 6 is interlocked with the $7^{th}$ speed drive gear 17.

The $1^{st}$ speed—$3^{rd}$ speed oriented shift sleeve 18 and the $5^{th}$ speed—$7^{th}$ speed oriented shift sleeve 19 are adapted, when both removed to the neutral positions, to be cooperative to set the odd-speed shift position drive shaft 6 free from any one of engagements thereof with the $1^{st}$ speed drive gear 14, the $3^{rd}$ speed drive gear 15, the $5^{th}$ speed drive gear 16, and the $7^{th}$ speed drive gear 17.

By doing so, no drive power is transferred between the odd-speed shift position drive shaft 6 and the array 20A of odd-speed shift position drive gears including the $1^{st}$ speed drive gear 14, the $3^{rd}$ speed drive gear 15, the $5^{th}$ speed drive gear 16, and the $7^{th}$ speed drive gear 17.

It is noted that there is an odd-speed shift position changing mechanism 20 comprised of the odd-speed shift position drive shaft 6, the odd-speed shift position driven gear 12, the odd-speed shift position clutch 13, the $1^{st}$ speed drive gear 14, the $3^{rd}$ speed drive gear 15, the $5^{th}$ speed drive gear 16, the $7^{th}$ speed drive gear 17, the $1^{st}$ speed—$3^{rd}$ speed oriented shift sleeve 18, and the $5^{th}$ speed—$7^{th}$ speed oriented shift sleeve 19.

Figure 4:
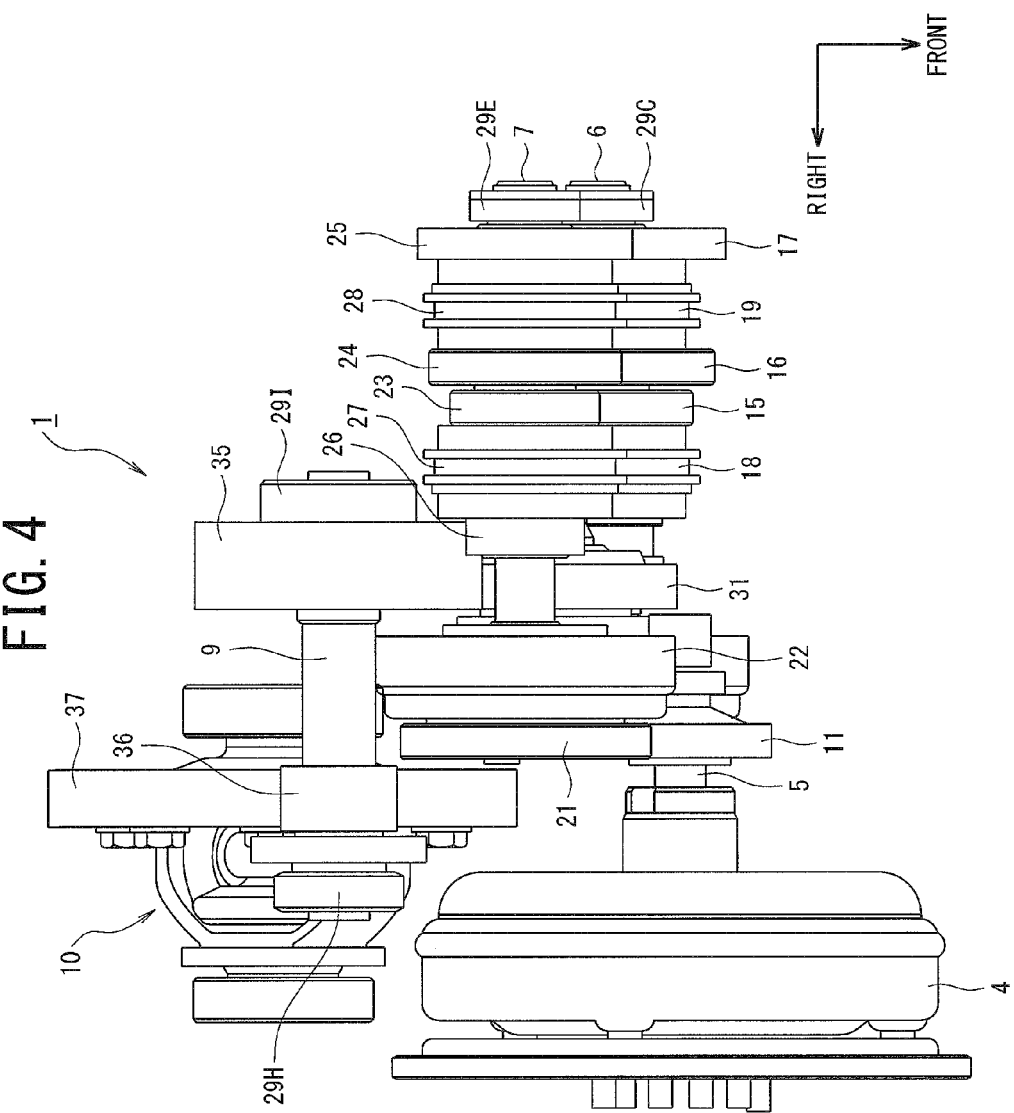
FIG. 4 is a top view of the automatic transmission, as a figure showing an automatic transmission according to an embodiment of this invention.

As shown in FIG. 1, FIG. 2, or FIG. 4, the even-speed shift position driven gear 21 is fixed to an even-speed shift position clutch 22. The even-speed shift position clutch 22 is installed on the even-speed shift position drive shaft 7. The even-speed shift position clutch 22 is adapted to have the even-speed shift position driven gear 21 interlocked with or released to be free from the even-speed shift position drive shaft 7, depending on whether not the even-speed shift position clutch 22 is supplied with hydraulic pressures.

By doing so, when the even-speed shift position clutch 22 is supplied with hydraulic pressures, the even-speed shift position driven gear 21 is interlocked with the even-speed shift position drive shaft 7, thus permitting drive power of the input shaft 5 to be transferred to the even-speed shift position drive shaft 7, via the drive gear 11 on the input shaft 5, the even-speed shift position driven gear 21, and the even-speed shift position clutch 22.

On the other hand, when the even-speed shift position clutch 22 has hydraulic pressures released therefrom, the even-speed shift position driven gear 21 is disconnected from the even-speed shift position drive shaft 7, thus keeping drive power of the input shaft 5 from being transferred to the even-speed shift position drive shaft 7. That is, the transfer of drive power from the input shaft 5 is broken.

The even-speed shift position drive shaft 7 has an array 30A of even-speed shift position drive gears even-numbered in the order of speed change ratios, including a $2^{nd}$ speed drive gear 23, a $4^{th}$ speed drive gear 24, and a $6^{th}$ speed drive gear 25, and besides, it has a drive gear 26 for a reverse speed shift position (referred herein to sometimes simply as a reverse speed). The $2^{nd}$ speed drive gear 23, the $4^{th}$ speed drive gear 24, the $6^{th}$ speed drive gear 25, and the reverse speed drive gear 26 are each rotatable relative to the even-speed shift position drive shaft 7. The even-speed shift position drive shaft 7 as well as the even-speed shift position clutch 22 is supported by bearings 29D and 29E in a rotatable manner to the transmission case 1A.

The even-speed shift position drive shaft 7 is provided with "a shift sleeve serving for making a shift between a $2^{nd}$ speed shift position and the reverse speed shift position" (referred herein to as "a $2^{nd}$ speed—reverse speed oriented shift sleeve") 27, and "a shift sleeve serving for making a shift between a $4^{th}$ speed shift position and a $6^{th}$ speed shift position" (referred herein to as "a $4^{th}$ speed—speed oriented shift sleeve") 28. The $2^{nd}$ speed—reverse speed oriented shift sleeve 27 as well as the $4^{th}$ speed—$6^{th}$ speed oriented shift sleeve 28 is fit on the even-speed shift position drive shaft 7, to be movable in axial directions of the even-speed shift position drive shaft 7, and rotatable in rotational directions integrally with the even-speed shift position drive shaft 7.

The $2^{nd}$ speed—reverse speed oriented shift sleeve 27 as well as the $4^{th}$ speed—$6^{th}$ to speed oriented shift sleeve 28 is adapted, in situations involving the shift lever shifted to a reverse range or to the drive range, to be driven with hydraulic pressures supplied from the oil pump being commanded from the controller, in accordance with a position of the shift lever or with an associated speed change map.

The $2^{nd}$ speed—reverse speed oriented shift sleeve 27 is adapted, in a situation involving a current shift position determined to be the reverse speed shift position in accordance with a state of the shift lever shifted to the reverse range, to be moved from a neutral position thereof in FIG. 1, rightward, with hydraulic pressures supplied from the oil pump following that determination. Along with this, the even-speed shift position drive shaft 7 is interlocked with the reverse speed drive gear 26.

The $2^{nd}$ speed—reverse speed oriented shift sleeve 27 is adapted, in a situation involving a current shift position determined to be a shift positon for a $2^{nd}$ speed in accordance with the speed change map, to be moved from the neutral position in FIG. 1, leftward, with hydraulic pressures supplied from the oil pump following that determination. Along with this, the even-speed shift position drive shaft 7 is interlocked with the $2^{nd}$ speed drive gear 23.

The $4^{th}$ speed—$6^{th}$ speed oriented shift sleeve 28 is adapted, in a situation involving a current shift position determined to be a shift positon for a $4^{th}$ speed in accordance with the speed change map, to be moved from a neutral position thereof in FIG. 1, rightward, with hydraulic pressures supplied from the oil pump following that determination. Along with this, the even-speed shift position drive shaft 7 is interlocked with the $4^{th}$ speed drive gear 24.

The $4^{th}$ speed—$6^{th}$ speed oriented shift sleeve 28 is adapted, in a situation involving a current shift position determined to be a shift positon for a $6^{th}$ speed in accordance with the speed change map, to be moved from the neutral position in FIG. 1, leftward, with hydraulic pressures supplied from the oil pump following that determination. Along with this, the even-speed shift position drive shaft 7 is interlocked with the 6$^{th}$ speed drive gear 25.

The 2$^{nd}$ speed—reverse speed oriented shift sleeve 27 and the 4$^{th}$ speed—6$^{th}$ speed oriented shift sleeve 28 are adapted, when both removed to the neutral positions, to be cooperative to set the even-speed shift position drive shaft 7 free from any one of engagements thereof with the 2$^{nd}$ speed drive gear 23, the 4$^{th}$ speed drive gear 24, the 6$^{th}$ speed drive gear 25, and the reverse speed drive gear 26. By doing so, no drive power is transferred between the even-speed shift position drive shaft 7 and any one of the 2$^{nd}$ speed drive gear 23, the 4$^{th}$ speed drive gear 24, the 6$^{th}$ speed drive gear 25, and the reverse speed drive gear 26.

It is noted that there is an even-speed shift position changing mechanism 30 comprised of the even-speed shift position drive shaft 7, the even-speed shift position driven gear 21, the even-speed shift position clutch 22, the 2$^{nd}$ speed drive gear 23, the 4$^{th}$ speed drive gear 24, the 6$^{th}$ speed drive gear 25, the reverse speed drive gear 26, the 2$^{nd}$ speed—reverse speed oriented shift sleeve 27, and the 4$^{th}$ speed—6$^{th}$ speed oriented shift sleeve 28.

The counter shaft 8 has a 1$^{st}$ speed driven gear 31, "a driven gear serving for making a shift between the 2$^{nd}$ speed shift position and the 3$^{rd}$ speed shift position" (referred herein to as "a 2$^{nd}$ speed—3$^{rd}$ speed driven gear") 32, "a driven gear serving for making a shift between the 4$^{th}$ speed shift position and the 5$^{th}$ speed shift position" (referred herein to as "a 4$^{th}$ speed—5$^{th}$ speed driven gear") 33, and "a driven gear serving for making a shift between the 6$^{th}$ speed shift position and the 7$^{th}$ speed shift position" (referred herein to as "a 4$^{th}$ speed—7$^{th}$ speed driven gear") 34. The 1$^{st}$ speed driven gear 31, the 2$^{nd}$ speed—3$^{rd}$ speed driven gear 32, the 4$^{th}$ speed—5$^{th}$ speed driven gear 33, and the 6$^{th}$ speed—7$^{th}$ speed driven gear 34 are cooperative to constitute an array 39 of driven gears on the counter shaft 8. The counter shaft 8 is supported by bearings 29F and 29G in a rotatable manner to the transmission case 1A.

The 2$^{nd}$ speed—3$^{rd}$ speed driven gear 32 is normally meshing with the 3$^{rd}$ speed drive gear 15 being an odd speed drive gear and with the 2$^{nd}$ speed drive gear 23 being an even speed drive gear, permitting a transfer of drive power to be made from either the 3$^{rd}$ speed drive gear 15 or the 2$^{nd}$ speed drive gear 23 to the 2$^{nd}$ speed—3$^{rd}$ speed driven gear 32.

The 4$^{th}$ speed—5$^{th}$ speed driven gear 33 is normally meshing with the 5$^{th}$ speed drive gear 16 being an odd speed drive gear and with the 4$^{th}$ speed drive gear 24 being an even speed drive gear, permitting a transfer of drive power to be made from either the 5$^{th}$ speed drive gear 15 or the 4$^{th}$ speed drive gear 24 to the 4$^{th}$ speed—5$^{th}$ speed driven gear 33.

The 6$^{th}$ speed—7$^{th}$ speed driven gear 34 is normally meshing with the 7$^{th}$ speed drive gear 17 being an odd speed drive gear and with the 6$^{th}$ speed drive gear 25 being an even speed drive gear, permitting a transfer of drive power to be made from either the 7$^{th}$ speed drive gear 17 or the 6$^{th}$ speed drive gear 25 to the 6$^{th}$ speed—speed driven gear 34.

The output shaft 9 has at one end thereof an output gear 35 and at an opposite end thereof a final drive gear 36. The output shaft 9 is supported by bearings 29H and 29I in a rotatable manner to the transmission case 1A. The output gear 35 is normally meshing with the 1$^{st}$ speed driven gear 3 and with the reverse speed drive gear 26, permitting a transfer of drive power from the 1$^{st}$ speed driven gear 3 or the reverse speed drive gear 26 to the output gear 35.

The final drive gear 36 is normally meshing with a final driven gear 37 of the differential device 10. By doing so, there can be drive power transferred from the output shaft 9 to the differential device 10 through the final drive gear 36 and the final driven gear 37, permitting transfers of drive power to be made to non-depicted right and left drive wheels, through drive shafts 38R and 38L extending rightward and leftward from the differential device 10.

As shown in FIG. 3, the odd-speed shift position drive shaft 6 is disposed under the input shaft 5, and the even-speed shift position drive shaft 7 is disposed over the input shaft 5. The output shaft 9 is located over an axial line 37A of the final driven gear 37, rearward in a perpendicular direction to an axial line of the even-speed shift position drive shaft 7.

As shown in FIG. 4, in the automatic transmission 1, the output shaft 9 is disposed to have the even-speed shift position clutch 22 located between the output gear 35 and the final drive gear 36 in an axial direction of the output shaft 9. Further, as shown in FIG. 3, in the automatic transmission 1, the output shaft 9 is disposed to have the output gear 35 and the even-speed shift position clutch 22 partially overlapping each other, when viewed along the axial direction of the output shaft 9, within a prescribed range of radial directions (that is, within a prescribed angular range about an axis of rotation) of the output gear 35.

As shown in FIG. 3, in the automatic transmission 1, the odd-speed shift position drive shaft 6, the even-speed shift position drive shaft 7, and the counter shaft 8 are disposed for an axis-to-axis distance (that is, a center-to-center distance) L1 between the counter shaft 8 and the odd-speed shift position drive shaft 6 to be greater than an axis-to-axis distance (that is, a center-to-center distance) L2 between the counter shaft 8 and the even-speed shift position drive shaft 7.

As shown in FIG. 2, in the automatic transmission 1, the input shaft 5 and the counter shaft 8 are disposed to provide an axis-to-axis distance between the input shaft 5 and the counter shaft 8, within a range for a combination of the bearing 29A of the input shaft 5 and one bearing 29F (nearer to the bearing 29A of the input shaft 5 in the two bearings 29F and 29G) of the counter shaft 8 to be free from interferences in between in radial directions of the counter shaft 8.

Figure 5:
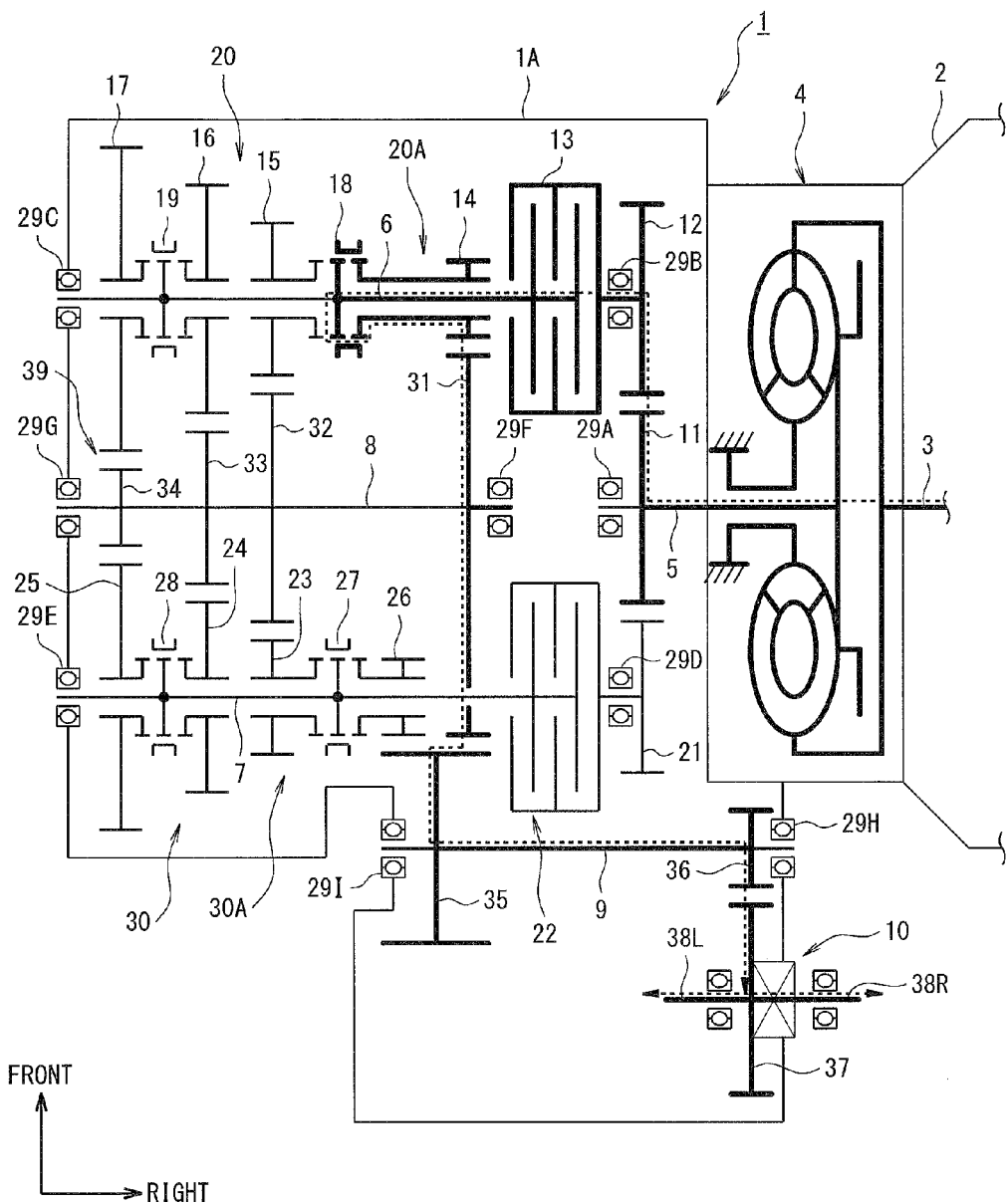
FIG. 5 is a skeleton diagram of the automatic transmission, involving a transfer route of torque for a speed change to be made at a first speed shift position, as a figure showing an automatic transmission according to an embodiment of this invention.
Figure 6:
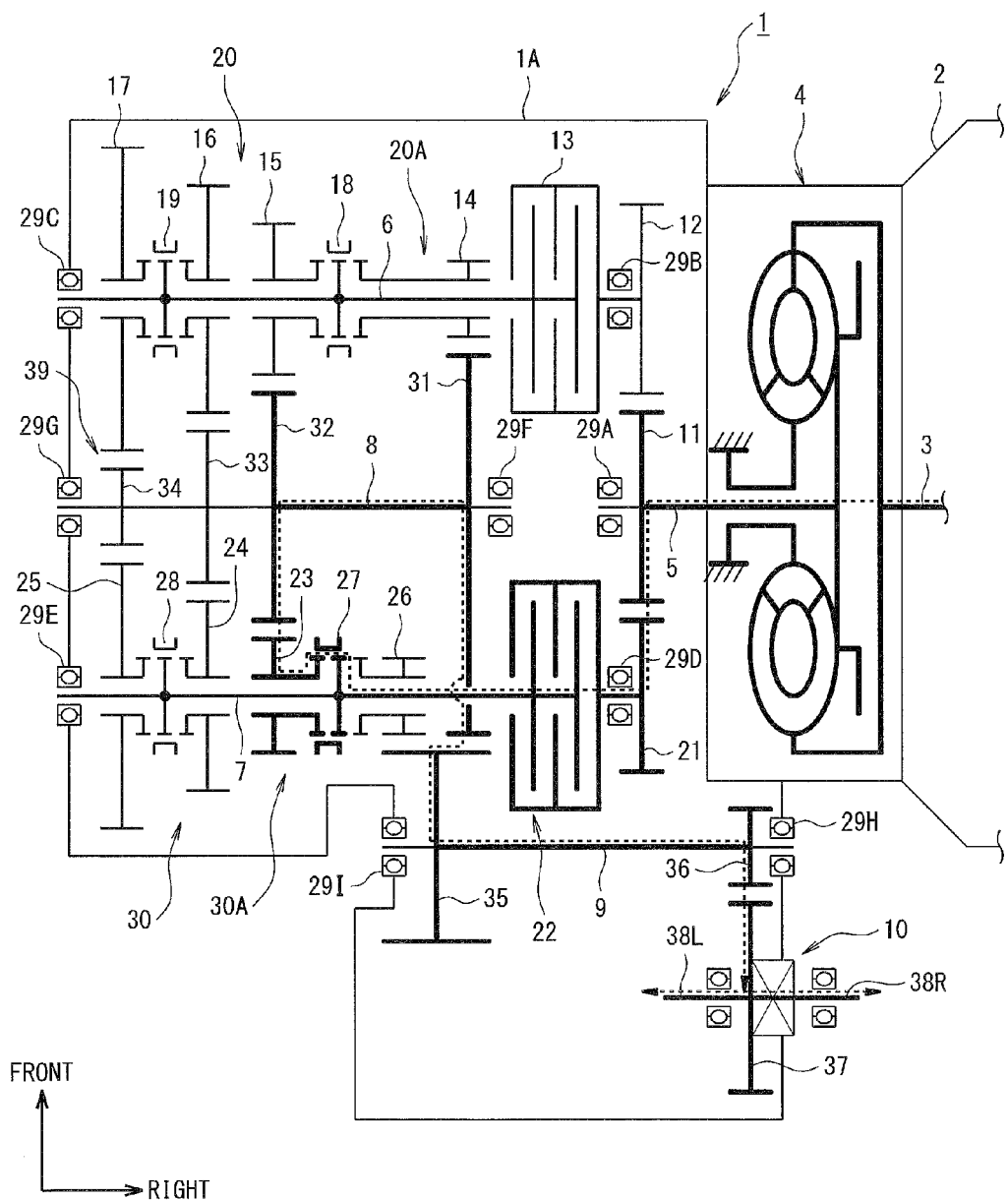
FIG. 6 is a skeleton diagram of the automatic transmission, involving a transfer route of torque for a speed change to be made at a second speed shift position, as a figure showing an automatic transmission according to an embodiment of this invention.
Figure 7:
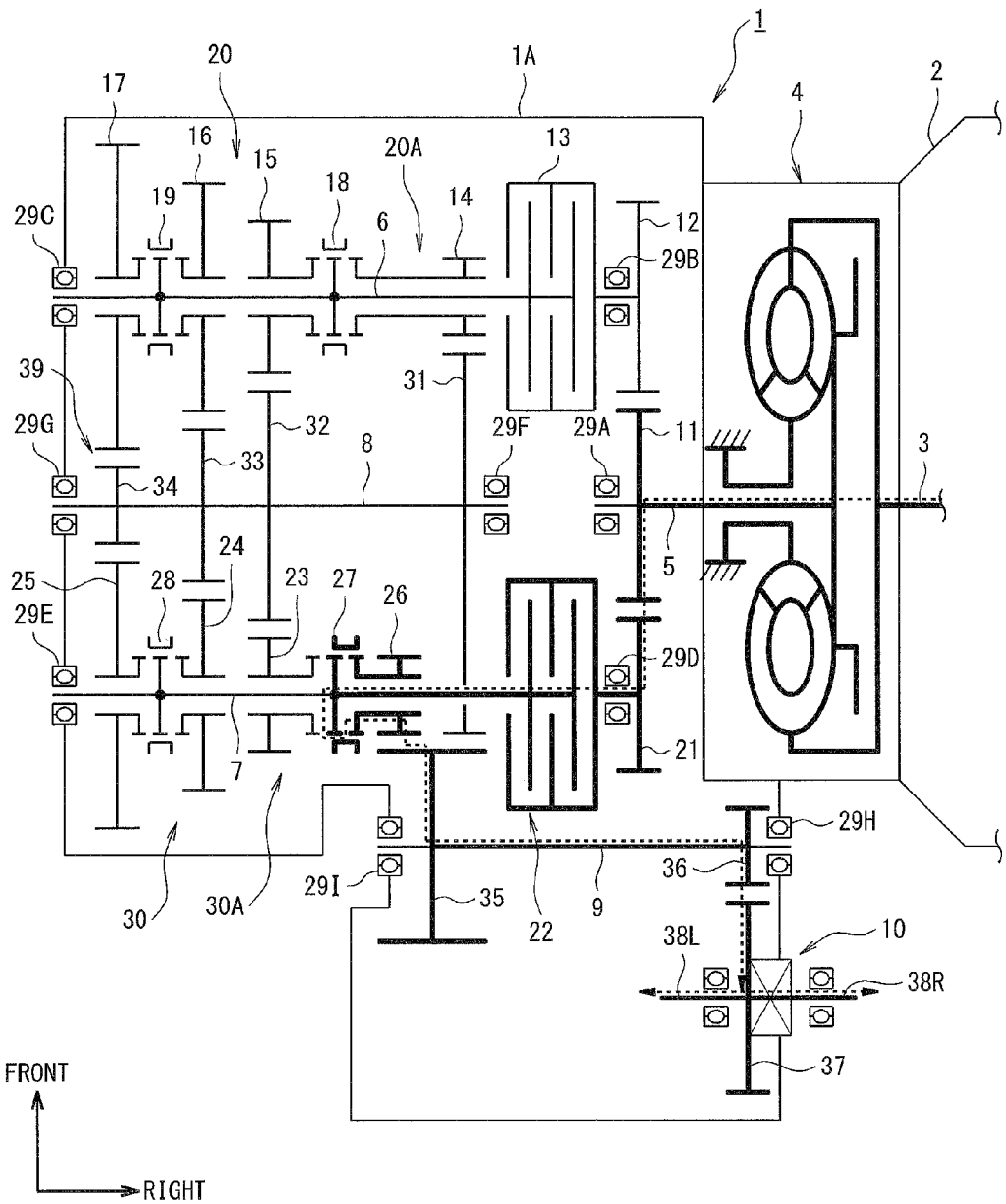
FIG. 7 is a skeleton diagram of the automatic transmission, involving a transfer route of torque for a speed change to be made at a reverse speed shift position, as a figure showing an automatic transmission according to an embodiment of this invention.
Figure 8:
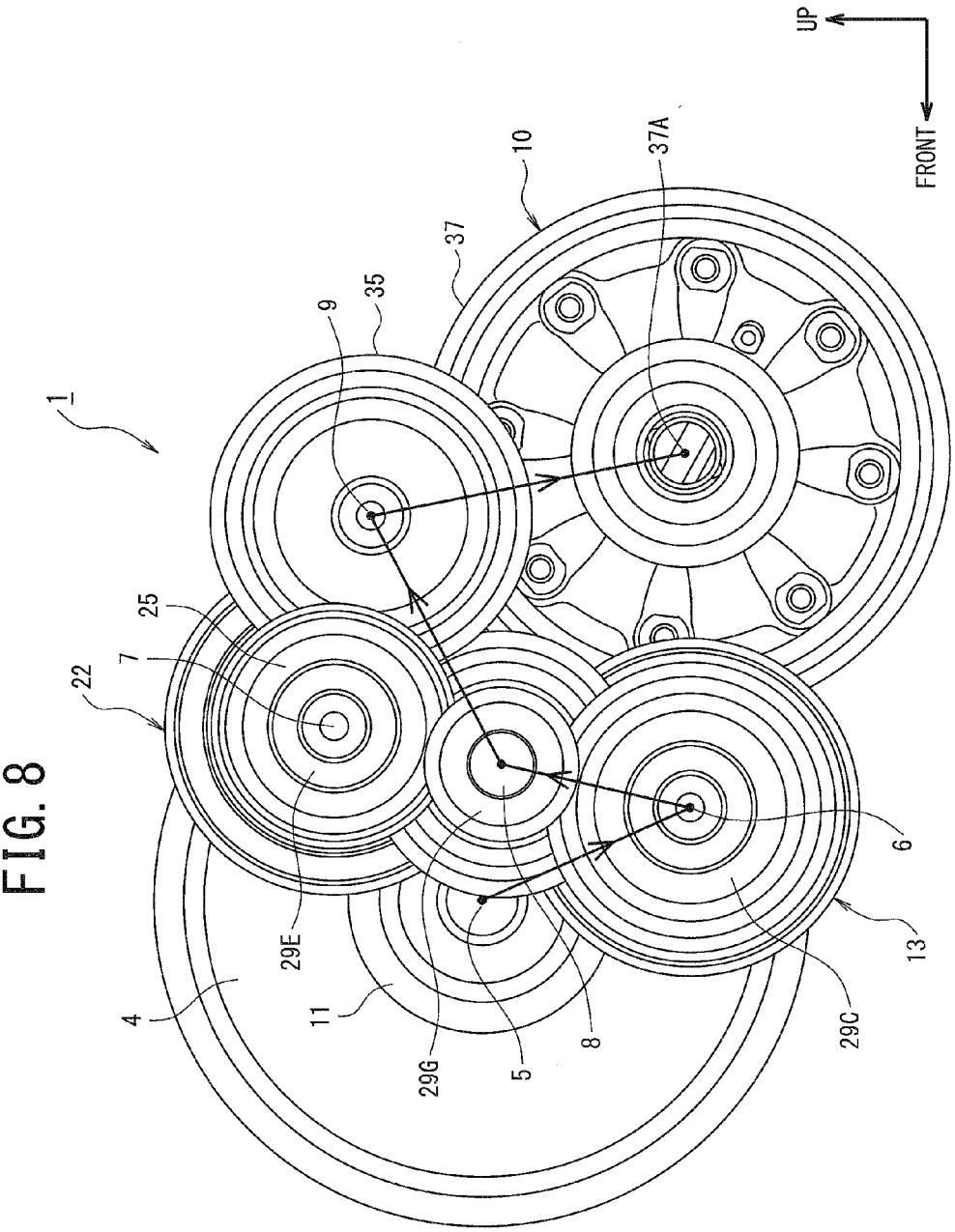
FIG. 8 is a side view of the automatic transmission, involving a transfer route of torque for a speed change to be made at an odd-speed shift position, as a figure showing an automatic transmission according to an embodiment of this invention.
Figure 9:
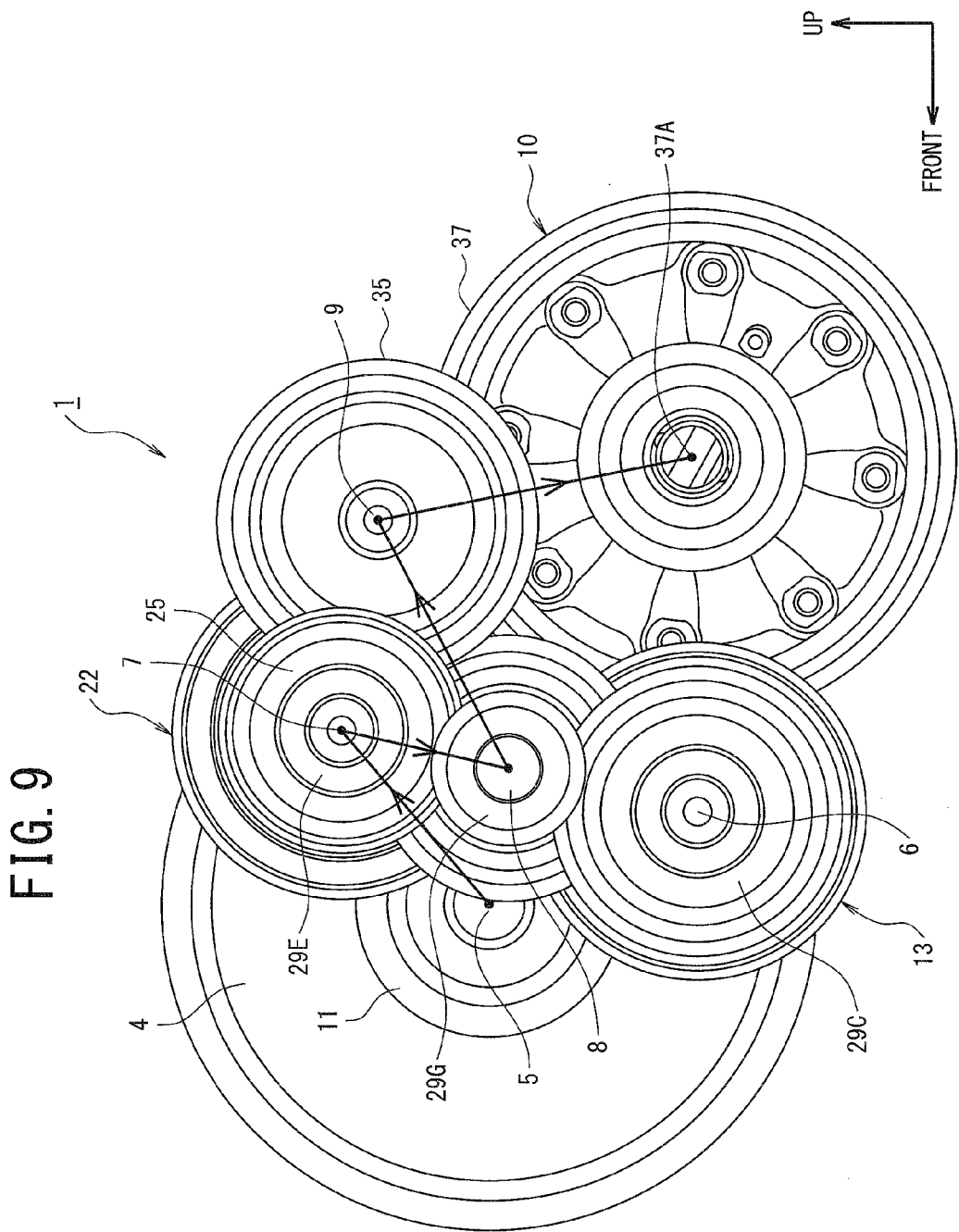
FIG. 9 is a side view of the automatic transmission, involving a transfer route of torque for a speed change to be made at an even-speed shift position, as a figure showing an automatic transmission according to an embodiment of this invention.
Figure 10:
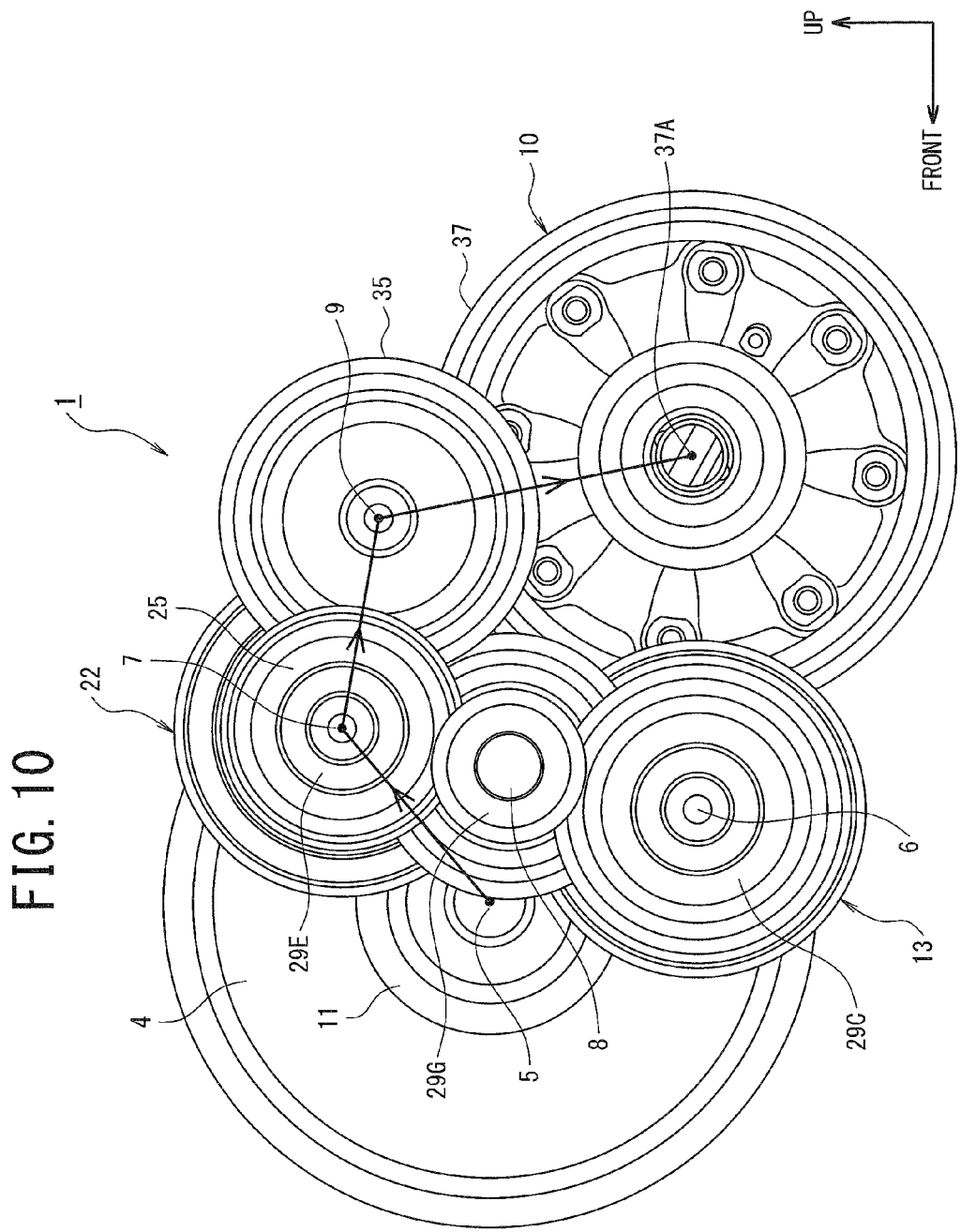
FIG. 10 is a side view of the automatic transmission, involving a transfer route of torque for a speed change to be made at a reverse speed shift position, as a figure showing an automatic transmission according to an embodiment of this invention.

There will be described performances of the automatic transmission 1, with reference being made to FIGS. 5 to 7 showing sequential connections of drive power transfer routes at involved shift positions, and FIGS. 8 to 10 showing associated shaft positions. In any sequence of transfer routes, there can be drive power of the engine 2 transferred from the crankshaft 3, through the torque converter 4 to the input shaft 5, and then transferred through the drive gear 11 to both the odd-speed shift positon driven gear 12 and the even-speed shift position driven gear 21. In situations involving a stopped state of the vehicle, the odd-speed shift position clutch 13 as well as the even-speed shift position clutch 22 is kept in a released state, thus affording for no drive power to be transferred from the odd-speed shift positon driven gear 12 or the even-speed shift position driven gear 21 to the odd-speed shift positon drive shaft 6 or the even-speed shift position drive shaft 7.

(Drive Power Transfer Routes for the 1$^{st}$ Speed Shift Position)

When the shift lever is shifted to the drive range by the driver for operations to move the vehicle forward, as shown in FIG. 5, the odd-speed shift position changing mechanism 20 has the 1$^{st}$ speed—3$^{rd}$ speed oriented shift sleeve 18 moved from the neutral position, rightward as in FIG. 5, with hydraulic pressures supplied from the oil pump being commanded by the controller, as the odd-speed shift position clutch 13 is still released to be free. Along with this, the $1^{st}$ speed drive gear 14 is interlocked with the odd-speed shift positon drive shaft 6, constituting a standby state for the $1^{st}$ speed shift position.

When a non-depicted accelerator is operated by the driver to start moving the vehicle forward from the state above, the odd-speed shift position clutch 13 has hydraulic pressures supplied thereto from the oil pump being commanded by the controller, so the odd-speed shift position clutch 13 comes through an imperfect-clutched state to an engaged state. Along with this, the odd-speed shift positon drive shaft 6 receives drive power transferred from the odd-speed shift positon driven gear 12. During this course, the even-speed shift position clutch 22 is cut off Further, the even-speed shift position changing mechanism 30 has the $2^{nd}$ speed—reverse speed oriented shift sleeve 27 moved from the neutral position in FIG. 5, leftward, with hydraulic pressures supplied from the oil pump being commanded by the controller, as the even-speed shift position clutch 22 is still released to be free. Along with this, the $2^{nd}$ speed drive gear 23 is interlocked with the even-speed shift positon drive shaft 7, constituting a standby state for the $2^{nd}$ speed shift position.

As will be seen from FIG. 5 and FIG. 8, there can be drive power transferred to the input shaft 5, and further transferred therefrom to the final driven gear 37, through the drive gear 11, the odd-speed shift position driven gear 12, the odd-speed shift position clutch 13, the odd-speed shift positon drive shaft 6, the $1^{st}$ speed drive gear 14, the $1^{st}$ speed driven gear 31, the output gear 35, the output shaft 9, and the final drive gear 36. Afterward, such drive power is transferred from the differential device 10, through the drive shafts 38R and 38L, to the drive wheels. As a result, the vehicle moves forward, running at a $1^{st}$ speed.

(Drive Power Transfer Routes for the $2^{nd}$ Speed Shift Position)

When it is determined by the controller to enter a running at a $2^{nd}$ speed in accordance with a shift command based on an involved speed change map or with an indication by operation of the driver, as shown in FIG. 6, the odd-speed shift position changing mechanism 20 following commands of the controller has hydraulic pressures having been supplied to and now discharged from the odd-speed shift position clutch 13, thus having no hydraulic pressures acting on the odd-speed shift position clutch 13, so the odd-speed shift position clutch 13 is released to be free. On the other hand, the even-speed shift position changing mechanism 30 following commands of the controller has hydraulic pressures delivered from the oil pump and supplied to the even-speed shift position clutch 22, so the even-speed shift position clutch 22 gets engaged. Suh being the case, in the region for running at a $2^{nd}$ speed, the odd-speed shift position clutch 13 has no hydraulic pressures acting thereon, so the odd-speed shift position clutch 13 is cut off, while the even-speed shift position clutch 22 is supplied with hydraulic pressures, so the even-speed shift position clutch 22 is engaged.

By doing so, there can be drive power transferred from the even-speed shift position driven gear 21 to the even-speed shift position drive shaft 7. In this situation, the odd-speed shift position clutch 13 is cut off. Further, the odd-speed shift position changing mechanism 20 has the $1^{st}$ speed—$3^{rd}$ speed oriented shift sleeve 18 moved from the neutral position in FIG. 1, leftward, with hydraulic pressures supplied from the oil pump being commanded by the controller, as the odd-speed shift position clutch 13 is released to be free. Along with this, the $3^{rd}$ speed drive gear 15 is interlocked with the odd-speed shift positon drive shaft 6, constituting a standby state for the $3^{rd}$ speed shift position.

As will be seen from FIG. 6 and FIG. 9, there can be drive power transferred to the input shaft 5, and further transferred therefrom to the final driven gear 37, through the drive gear 11, the even-speed shift position driven gear 21, the even-speed shift position clutch 22, the even-speed shift positon drive shaft 7, the $2^{nd}$ speed drive gear 23, the $2^{nd}$ speed—$3^{rd}$ speed driven gear 32, the counter shaft 8, the $1^{st}$ speed driven gear 31, the output gear 35, the output shaft 9, and the final drive gear 36. Afterward, such drive power is transferred from the differential device 10, through the drive shafts 38R and 38L, to the drive wheels. As a result, with a completed shift from the $1^{st}$ speed shift position to the $2^{nd}$ speed shift position, the vehicle gets running at a $2^{nd}$ speed.

(Drive Power Transfer Routes for the Reverse Speed Shift Position)

When the shift lever is shifted to the reverse range by the driver for operations to move the vehicle backward, as shown in FIG. 7, the even-speed shift position changing mechanism 30 has the $2^{nd}$ speed—reverse speed oriented shift sleeve 27 moved from the neutral position, rightward as in FIG. 7, with hydraulic pressures supplied from the oil pump being commanded by the controller. Along with this, the reverse speed drive gear 26 is interlocked with the even-speed shift positon drive shaft 7, constituting a standby state.

When the accelerator is operated by the driver to start moving the vehicle backward from the state above, the even-speed shift position clutch 22 has hydraulic pressures supplied thereto from the oil pump being commanded by the controller, so the even-speed shift position clutch 22 comes through an imperfect-clutched state to an engaged state. Along with this, the even-speed shift positon drive shaft 7 receives drive power transferred from the even-speed shift positon driven gear 21.

As will be seen from FIG. 7 and FIG. 10, there can be drive power transferred to the input shaft 5, and further transferred therefrom to the final driven gear 37, through the drive gear 11, the even-speed shift position driven gear 21, the even-speed shift position clutch 22, the even-speed shift positon drive shaft 7, the reverse speed drive gear 26, the output gear 35, the output shaft 9, and the final drive gear 36. Afterward, such drive power is transferred from the differential device 10, through the drive shafts 38R and 38L, to the drive wheels. As a result, the vehicle moves backward, running at a reverse speed.

Such being the case, according to embodiments herein, in the automatic transmission 1, the output shaft 9 has the output gear 35 fixed thereon at one end thereof (nearer to the combination of the $1^{st}$ speed driven gear 31 and the reverse speed drive gear 26), and the final drive gear 36 fixed thereon at another end (axially opposite to the one end) thereof, meshing with the final driven gear 37 of the differential device 10. The output gear 35 is meshing with the $1^{st}$ speed driven gear 31 (in the array 39 of driven gears 31, 32, 33, and 34 on the counter shaft 8) meshing with the $1^{st}$ speed drive gear 14 (in the array 20A of odd-speed shift position drive gears 14, 15, 16, and 17 on the odd-speed shift position drive shaft 6), and with the reverse speed drive gear 26 (on the even-speed shift position drive shaft 7).

By doing so, the output gear 35 can be communized between a sequence of power transfer routs for a reverse speed and a set of sequences of power transfer routes for forward speeds, thus affording to avoid using reverse idler gear mechanisms in the past. Accordingly, the automatic transmission 1 can be down-sized and light-weighted.

Further, the provision of a single output gear 35 meshing with "the 1st speed driven gear 31 and the reverse speed drive gear 26" does permit a switching between the reverse speed shift position and any one of the forward speed shift positions, thus affording to have a simplified sequence of power transfer routes when making a speed change between the reverse speed and any forward speed, thus allowing for a smoothed speed change.

Further, according to embodiments herein, in the automatic transmission 1, the odd-speed shift position drive shaft 6 is disposed under (that is, at lower levels than) the input shaft. And, the even-speed shift position drive shaft 7 is disposed over (that is, at upper levels than) the input shaft. In addition, the output shaft 9 is located over (that is, at upper levels than) an axial line 37A of the final driven gear 37, rearward in perpendicular directions to (that is, normally rearward within a prescribed angular range of) an axial line of the even-speed shift position drive shaft 7. By doing so, the output shaft 9 can have (at an end thereof nearer to the torque converter 4) the bearing 29H disposed in adequate position in radial directions of the output shaft 9, successfully avoiding (specifically, without circumventing to avoid interferences with) a maximal outside-diameter portion of a circle-tubular casing (see FIGS. 2 to 4) of the torque converter 4 (nearest to the output shaft 9) in vehicle-longitudinal directions (or horizontally longitudinal directions or in a plan). In addition, the bearing 29H can be composed of a set of bearing units aligned in axial directions of the output shaft 9 parallel to vehicle-transverse directions, within a range of depth or width dimensions of the circle-tubular casing of the torque converter 4. Besides, the output shaft 9 can have a total axial length thereof reduced as necessary, and can be axially displaced to be nearer to the torque converter 4, as well.

Further, the output shaft 9 can be radially displaced to be nearer to the even-speed shift position drive shaft 7. By doing so, the output shaft 9 can be disposed with a reduced axis-to-axis distance to the even-speed shift position drive shaft 7. As a result such effects, in the automatic transmission 1, the output shaft 9 is adapted for a combination of an optimized configuration of itself and an optimized positioning thereof to implement a down-sized outside configuration of the transmission casing 1A, allowing for the automatic transmission 1 to be light-weighted.

Further, according to embodiments herein, in the automatic transmission 1, the output shaft 9 is provided with the output gear 35 at the one end and the final drive gear 36 at the opposite end. The output shaft 9 has an interconnect shaft part thereof between the output gear 35 and the final drive gear 36. This part is formed narrower (that is, with a smaller diameter) than the two ends carrying the output gear 35 and the final drive gear 36.

This configuration of the output shaft 9 is utilized for the output shaft 9 to be disposed to have the even-speed shift position clutch 22 (see FIG. 4) located between the output gear 35 and the final drive gear 36 in an axial direction of the output shaft 9, and to have the output gear 35 and the even-speed shift position clutch 22 (see FIG. 3) partially overlapping each other (in radial directions within a prescribed angular range of the output shaft 9), when viewed along the axial direction of the output shaft 9.

By doing so, the narrowed shaft part of the output shaft 9 can be disposed to be the nearer to the even-speed shift position drive shaft 7, allowing for the more effectively reduced axis-to-axis distance between the output shaft 9 and the even-speed shift position drive shaft 7. The automatic transmission 1 can thus be the more effectively down-sized and light-weighted.

Further, according to embodiments herein, in the automatic transmission 1, the odd-speed shift position drive shaft 6, the even-speed shift position drive shaft 7, and the counter shaft 8 are disposed for an axis-to-axis distance L1 between the counter shaft 8 and the odd-speed shift position drive shaft 6 to be greater than an axis-to-axis distance L2 between the counter shaft 8 and the even-speed shift position drive shaft 7.

By doing so, there can be a combination of the $2^{nd}$ speed—$3^{rd}$ speed driven gear 32, the $4^{th}$ speed—$5^{th}$ speed driven gear 33, and the $6^{th}$ speed—$7^{th}$ speed driven gear 34 each disposed to mesh with both of a drive gear at an associated shift position among the array 20A of odd-speed shift position drive gears and a drive gear at an associated shift position among the array 30A of even-speed shift position drive gears, in a fashion of the array 39 of such shared driven gears 32, 33, and 34, thus permitting a set of multiple shift positions to be effectively implemented in a confined spatial area, allowing for a schemed down-sizing of the automatic transmission 1.

Further, according to embodiments herein, in the automatic transmission 1, the input shaft 5 and the counter shaft 8 are disposed to provide an axis-to-axis distance between the input shaft 5 and the counter shaft 8, within a range for a combination of the bearing 29A of the input shaft 5 and the bearing 29F being nearer to the bearing 29A of the input shaft 5 in the bearings 29F and 29G of the counter shaft 8 to be free from interferences in between in radial directions of the counter shaft 8.

By doing so, there can be the combination of the bearing 29A of the input shaft 5 and the bearing 29F of the counter shaft 8 to be disposed on an identical flat plane, permitting the automatic transmission 1 to have a reduced total length, allowing for the more effective down-sizing of the automatic transmission 1.

It is noted that, according to embodiments herein, the automatic transmission 1 furnished in the vehicle may well have applications not limited thereto. For instance, it may well be applied to vessel ships, railway vehicles, or such, without restrictions thereto.

While embodiments of this invention have been described, it is apparent that some artisan could have made changes without departing from the scope of this invention. It is intended that any and all such modifications and equivalents are involved in the appended claims.

The invention claimed is:

1. An automatic transmission comprising:
   an input shaft coupled with a drive source;
   an odd-speed shift position drive shaft having an array of odd-speed shift position drive gears odd-numbered in an order of speed change ratios;
   an odd-speed shift position clutch installed on the odd-speed shift position drive shaft, and configured to make or break a transfer of drive power from the input shaft to the odd-speed shift position drive shaft;
   an even-speed shift position drive shaft disposed in parallel to the odd-speed shift position drive shaft, the even-speed shift position drive shaft having a combination of an array of even-speed shift position drive gears even-numbered in the order of speed change ratios and a reverse speed shift position drive gear;
   an even-speed shift position clutch installed on the even-speed shift position drive shaft, and configured to make or break a transfer of drive power from the input shaft to the even-speed shift position drive shaft;

a counter shaft disposed in parallel to the odd-speed shift position drive shaft and the even-speed shift position drive shaft, the counter shaft having an array of driven gears adapted to engage with drive gears of both of the array of odd-speed shift position drive gears and the array of even-speed shift position drive gears, for use of the array of driven gears to rotate the counter shaft; and an output shaft disposed in parallel to the odd-speed shift position drive shaft and the even-speed shift position drive shaft, and provided at an end thereof with an output gear, and at another end thereof with a final drive gear meshing with a final driven gear of a differential device, the output gear meshing with the reverse speed shift position drive gear and with a first speed driven gear in the array of driven gears meshing with a first speed drive gear in the array of odd-speed shift position drive gears.

2. The automatic transmission according to claim 1, wherein the odd-speed shift position drive shaft is disposed under the input shaft, the even-speed shift position drive shaft is disposed over the input shaft, and the output shaft is located over an axial line of the final driven gear, rearward in perpendicular directions to an axial line of the even-speed shift position drive shaft.

3. The automatic transmission according to claim 1, wherein the output shaft is disposed to have the even-speed shift position clutch located between the output gear and the final drive gear in an axial direction of the output shaft, and to have the output gear and the even-speed shift position clutch partially overlapping each other, when viewed along the axial direction of the output shaft.

4. The automatic transmission according to claim 1, wherein the odd-speed shift position drive shaft, the even-speed shift position drive shaft, and the counter shaft are disposed for an axis-to-axis distance between the counter shaft and the odd-speed shift position drive shaft to be greater than an axis-to-axis distance between the counter shaft and the even-speed shift position drive shaft.

5. The automatic transmission according to claim 1, wherein the input shaft and the counter shaft are disposed to provide an axis-to-axis distance between the input shaft and the counter shaft within a range for a combination of a bearing of the input shaft and a bearing nearer to the bearing of the input shaft in bearings of the counter shaft to be free from interferences in between in radial directions of the counter shaft.

* * * * *